US006040548A

United States Patent [19]

Siniaguine

[11] Patent Number: 6,040,548

[45] Date of Patent: Mar. 21, 2000

[54] APPARATUS FOR GENERATING AND DEFLECTING A PLASMA JET

[75] Inventor: Oleg Siniaguine, San Jose, Calif.

[73] Assignee: IPEC Precision, Inc., Bethel, Conn.

[21] Appl. No.: 09/194,246

[22] PCT Filed: May 30, 1997

[86] PCT No.: PCT/US97/09252

§ 371 Date: Nov. 25, 1998

§ 102(e) Date: Nov. 25, 1998

[87] PCT Pub. No.: WO97/46056

PCT Pub. Date: Dec. 4, 1997

Related U.S. Application Data

[60] Provisional application No. 60/018,857, May 31, 1996.

[51] Int. Cl.[7] .......... B23K 10/00

[52] U.S. Cl. .......... 219/121.48; 219/123; 219/121.52; 219/121.36; 315/111.21

[58] Field of Search .......... 219/121.48, 123, 219/121.36, 121.52, 121.59; 315/111.21, 111.41; 156/345; 204/298.37; 376/121, 141, 144

[56] References Cited

U.S. PATENT DOCUMENTS

| | | | |
|---|---|---|---|
| 3,453,474 | 7/1969 | Cann et al. . | |
| 5,308,417 | 5/1994 | Groechel et al. | 156/643 |
| 5,489,820 | 2/1996 | Ivanov et al. . | |
| 5,767,627 | 6/1998 | Siniaguiné | 315/111.41 |

FOREIGN PATENT DOCUMENTS

| | | |
|---|---|---|
| 2678467 | 12/1992 | France . |
| 2032281 | 3/1995 | U.S.S.R. . |
| 2059344 | 4/1996 | U.S.S.R. . |
| 2271044 | 3/1994 | United Kingdom . |
| 9212273 | 7/1992 | WIPO . |
| 9212610 | 7/1992 | WIPO . |
| 9316573 | 8/1993 | WIPO . |

*Primary Examiner*—Mark Paschall
*Attorney, Agent, or Firm*—Ware, Fressola, Van Der Sluys & Adolphson LLP

[57] ABSTRACT

A plasma jet generator apparatus enabling effective deflection of the generated plasma jet is described. The apparatus has an electrode chamber having a gas inlet and an outlet and an electrode positioned therein defining an electrode axis. A pair of magnetic deflection systems for deflecting the direction of the plasma flowing from the electrode axis are provided. The magnetic deflection systems are formed from pole pairs which are distributed about the electrode axis such that two magnetic fields that are substantially perpendicular to each other can be generated to deflect the plasma away from the electrode axis.

8 Claims, 9 Drawing Sheets

APPARATUS FOR GENERATING AND DEFLECTING A PLASMA JET

CROSS REFERENCE TO RELATED APPLICATIONS

This application is the National Stage of International Application No. PCT/US97/09252, filed on May 30, 1997, which claims the benefit of previous co-pending U.S. Provisional Application Ser. No. 60/018,857, filed on May 31, 1996.

BACKGROUND

1. Field of the Invention

The present invention relates to the plasma processing of substrates. More particularly, the present invention relates to an apparatus for generating and deflecting a plasma jet for treating substrates using a plasma jet treatment process.

2. Description of the Prior Art

Published application No. PCT/SU90/00286 describes a method for plasma processing of a material consisting of a system of more than two meeting plasma jets which form a mixing zone wherein a material to be processed is fed into the mixing zone. Direct electric currents are passed through sections of the plasma jets up to the mixing zone and a magnetic field is applied to the current conducting sections of each plasma jet. The apparatus for plasma processing of material described in the application comprises a charge conduit, an electric arc plasma jet generator further comprising a plurality of electrode units for generating the plasma jets. The electrode units are oriented at acute angles to an axis of the charge conduit and are connected to a direct current source. The apparatus further comprises a magnetic system formed from an open magnetic circuit with poles located in a mixing zone of the plasma jets. The apparatus described in PCT/SU90/00286 has very limited abilities to control direction of each plasma jet independently so as to control the structure of combined plasma flow.

Published application No. PCT/SU90/00287 describes an apparatus for plasma-arc processing of material. The apparatus comprises a charge conduit which is surrounded by a plurality of electric arc plasma jet generators and a magnetic system. The generators comprise two electrode assemblies. Solenoids are mounted on poles of the magnetic circuit. The apparatus can be used only if the plasma jets are directed towards the axis of the apparatus with angles more than 45 degrees. If the angles are less than 45 degrees then the magnetic system itself causes instability in each of the plasma jets and the combined plasma flow. Another disadvantage is that each plasma jet orientation can be controlled only when it is located in equilibrium position within a narrow zone near the corresponding basic plane where both a second and third magnetic field interacts with it. If the plasma jet is deflected relatively far from the basic plane then the effectiveness of the control significantly reduces because only one of these magnetic fields interact with the plasma jet.

In published Russian Patent No. 2032281, a method and apparatus for plasma flow production is described. Plasma jets are formed by any method and are directed symmetrically to the axis of a common plasma flow at an angle less than 45 degrees. Direct current is passed along each plasma jet in opposite directions relative to the common axis and external magnetic fields are applied to each jet. The 1st magnetic field is applied between the axis (4) of each jet and the common axis, while the 2nd and 3rd fields are applied to the half-spaces between the axes. Interaction of the magnetic fields and the current in the jet causes deflection of the jets from their axes (2). The induction of the fields are adjusted, to ensure the axis (4) of the jets are parallel to the common axis after interaction and the configuration of the external magnetic fields is selected to increase the stability of the plasma jets. During random slight displacements of the jets, inductance to one side increases and decreases to the other side, to ensure return of the axis of the jet to a direction parallel to the common axis. The disadvantage of the above described method and apparatus is that the method can be realized and correspondingly the device can be used only if the plasma jets are directed to the device axis with angles less than 45 degrees. If the angles are more than 45 degrees then the magnetic system itself induces instability of every plasma jet and the combined plasma flow. Another disadvantage is that each plasma jet orientation can be controlled only when it is located in an equilibrium position within narrow zone near the corresponding basic plane where both second and third magnetic fields interact with it. If the plasma jet is deflected relatively far from the basic plane, then the effectiveness of the control significantly reduces because of only one of these magnetic fields interacts with the plasma jet.

Russian patent document RU 2059344 discloses a plasma generating device including electrode units having a magnetic system comprising a pair of U-shaped members or poles and a solenoid. The ends of the poles are located in the space defined by the symmetrical planes intersecting the axis of symmetry of the device. However, the poles are not arranged in a manner to provide perpendicular magnetic fields for steering the plasma.

SUMMARY OF THE INVENTION

The apparatus of the present invention enables effective deflection of the direction of a plasma jet. The apparatus for generating and deflecting the plasma jet comprises an electrode chamber having a gas inlet and an outlet. An electrode is positioned within the electrode chamber. The electrode defines an electrode axis. The generator is provided with a first magnetic deflection system for applying a first magnetic field to a plasma flowing from the electrode chamber outlet so as to cause the plasma to deflect away from the electrode axis in a first direction relative to the electrode axis. The first magnetic deflection system comprises a first U-shaped member formed from a first base and a pair of first poles having ends and a first coil positioned about the base. The first magnetic deflection system is positioned about the electrode chamber so that the poles are on opposite sides of the electrode axis defined by the electrode positioned within the electrode chamber. The generator is also provided with a second magnetic deflection system for applying a second magnetic field to the plasma flowing from the electrode chamber outlet so as to cause the plasma to deflect away from the electrode axis in a second direction relative to the electrode axis. The second magnetic deflection system comprises a second U-shaped member formed from a second base and a pair of second poles having ends and a coil positioned about the base. The second magnetic deflection system is positioned about the electrode chamber so that the poles of the second pair are on opposite sides of the electrode axis defined by the electrode positioned within the electrode chamber. The second pair of poles is further positioned so that all of the poles of the system are uniformly distributed around the electrode axis and so that the first and second magnetic fields are substantially perpendicular to each other. The first and second magnetic deflection systems enable the plasma jet to be deflected away from the electrode axis in substantially any direction.

One object of the present invention is to provide an apparatus for generating a plasma jet and obtaining effective deflection of the generated plasma jet flowing from the apparatus.

The foregoing and other objects, features, and advantages will become apparent from the detailed description of the preferred embodiments invention as illustrated in the accompanying drawings.

BRIEF DESCRIPTION OF THE DRAWINGS

The drawings, which are not drawn to scale, include.

DETAILED DESCRIPTION OF THE INVENTION

Figure 1:
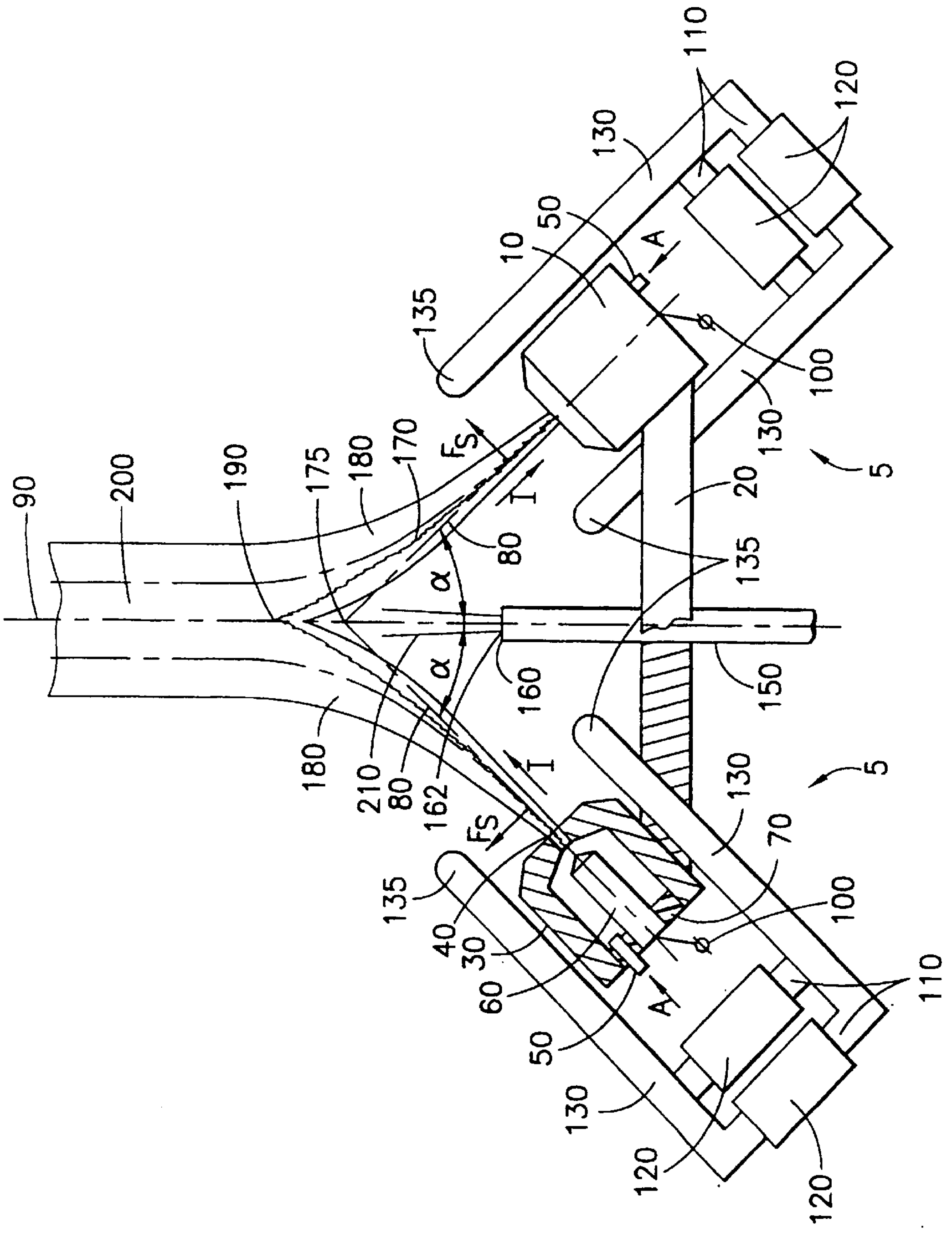
FIG. 1, which is a schematic side view diagram of one embodiment of the apparatus of the present invention having two plasma jet generator assemblies.
Figure 9:
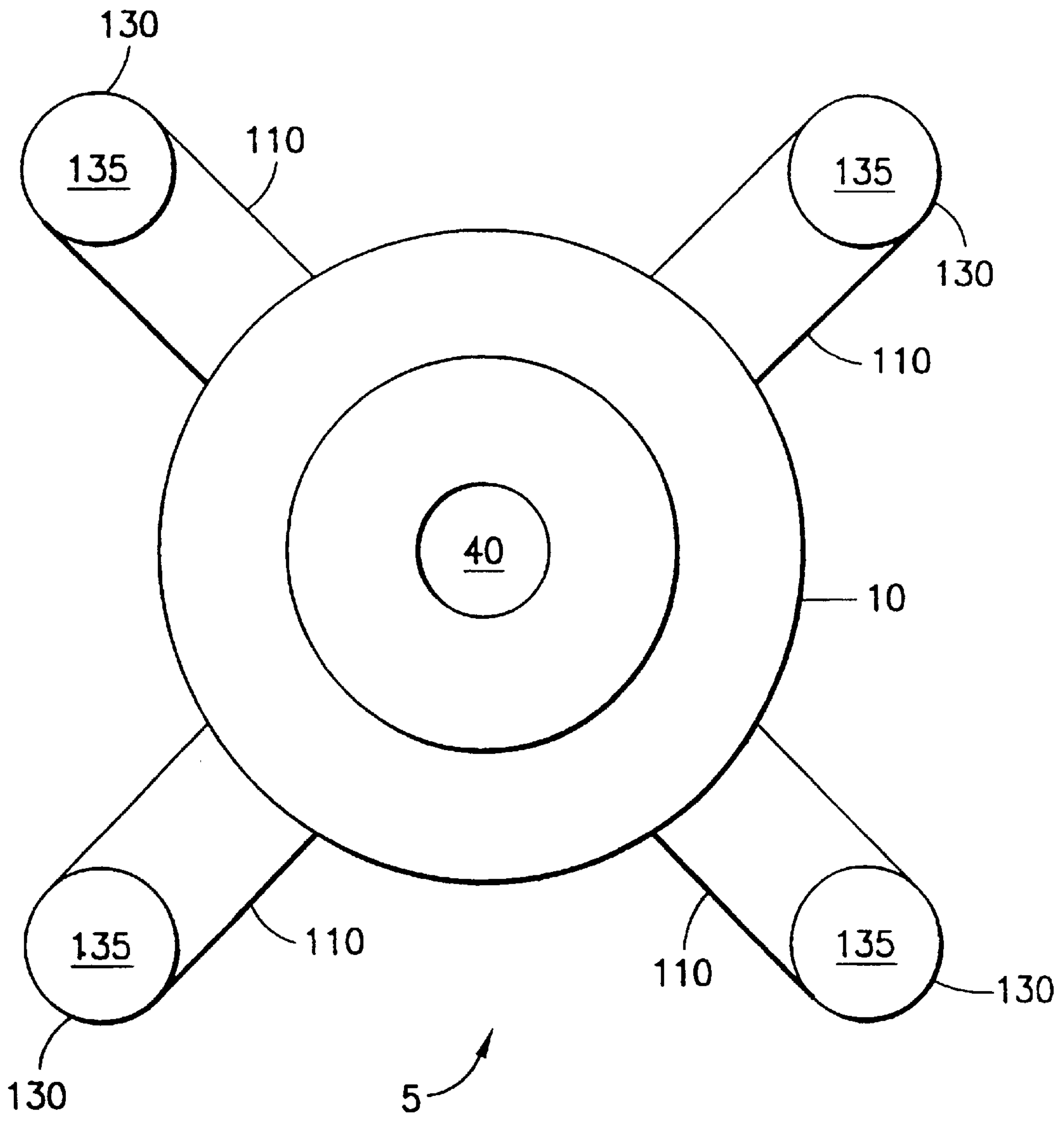
FIG. 9, which is a schematic top view diagram of an electrode assembly utilized in all the embodiments of the present invention.

Referring to FIG. 1, the apparatus for producing a flow of plasma comprises a plurality of plasma jet generator assemblies 5. Referring to FIGS. 1 and 9, each plasma jet generator assembly 5 is formed from an electrically isolated closed electrode chamber 10 having a base 30 with outlet orifice 40, gas inlet 50 and an electrode 60 positioned within the chamber 10 having an end seated in a dielectric gasket 70. The electrode 60 forms an electrode axis 80 which extends out of the orifice 40.

Referring to FIGS. 1, 7, 8 and 9, each plasma generator 5 is capable of generating and deflecting a plasma jet. Each generator 5 is provided with a first magnetic deflection system for applying a first magnetic field $B_1$ to a plasma flowing from the electrode chamber outlet so as to cause the plasma to flow away from the electrode axis in a first direction as a result of a first force $F_1$ on the plasma caused by the first magnetic field. The first magnetic deflection system comprises a first U-shaped member formed from a first base 110 and a pair of first poles 130 having ends 135 and a first coil 120 positioned about the base. The first magnetic deflection system is positioned about the electrode chamber so that the poles of the pair of first poles 130 are on opposite sides of the electrode axis defined by the electrode positioned within the electrode chamber. The generator is provided with a second magnetic deflection system for applying a second magnetic field to a plasma flowing from the electrode chamber outlet so as to cause the plasma to flow away from the electrode axis in a second direction as a result of a second force (F2) on the plasma caused by the second magnetic field $B_2$. The second magnetic deflection system comprises a second U-shaped member formed from a second base 110 and a pair of second poles 130 having ends 135 and a coil 120 positioned about the base. The second magnetic deflection system is positioned about the electrode chamber so that the poles of the pair of second poles are on opposite sides of the electrode axis defined by the electrode positioned within the electrode chamber. The first pair of poles and the second pair of poles are uniformly positioned about the electrode axis and so that the magnetic field across the first pair of poles is substantially perpendicular to the magnetic field across the pair of second poles.

Figure 2:
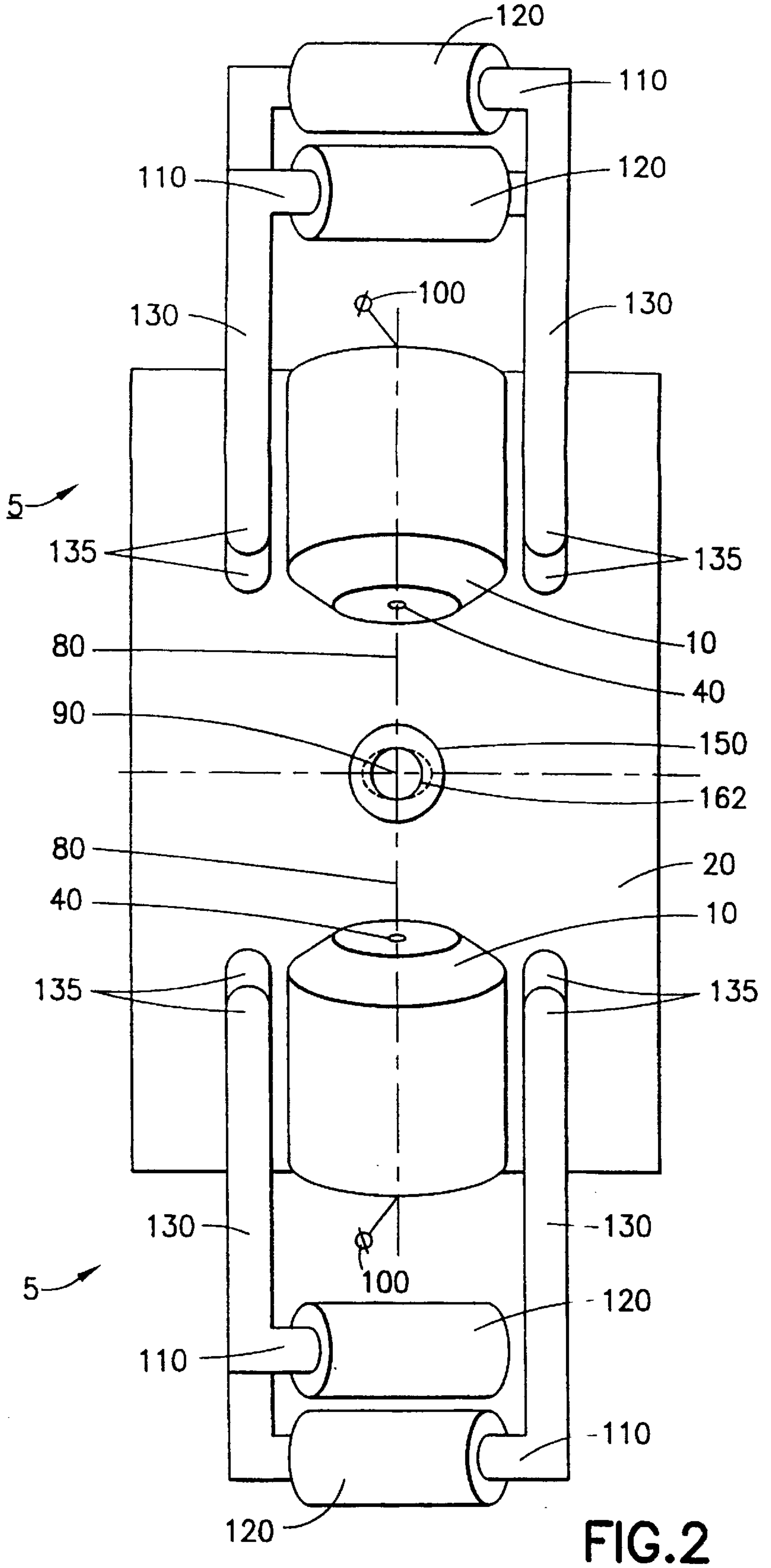
FIG. 2, which is a schematic top view diagram of the embodiment illustrated in FIG. 1.
Figure 3:
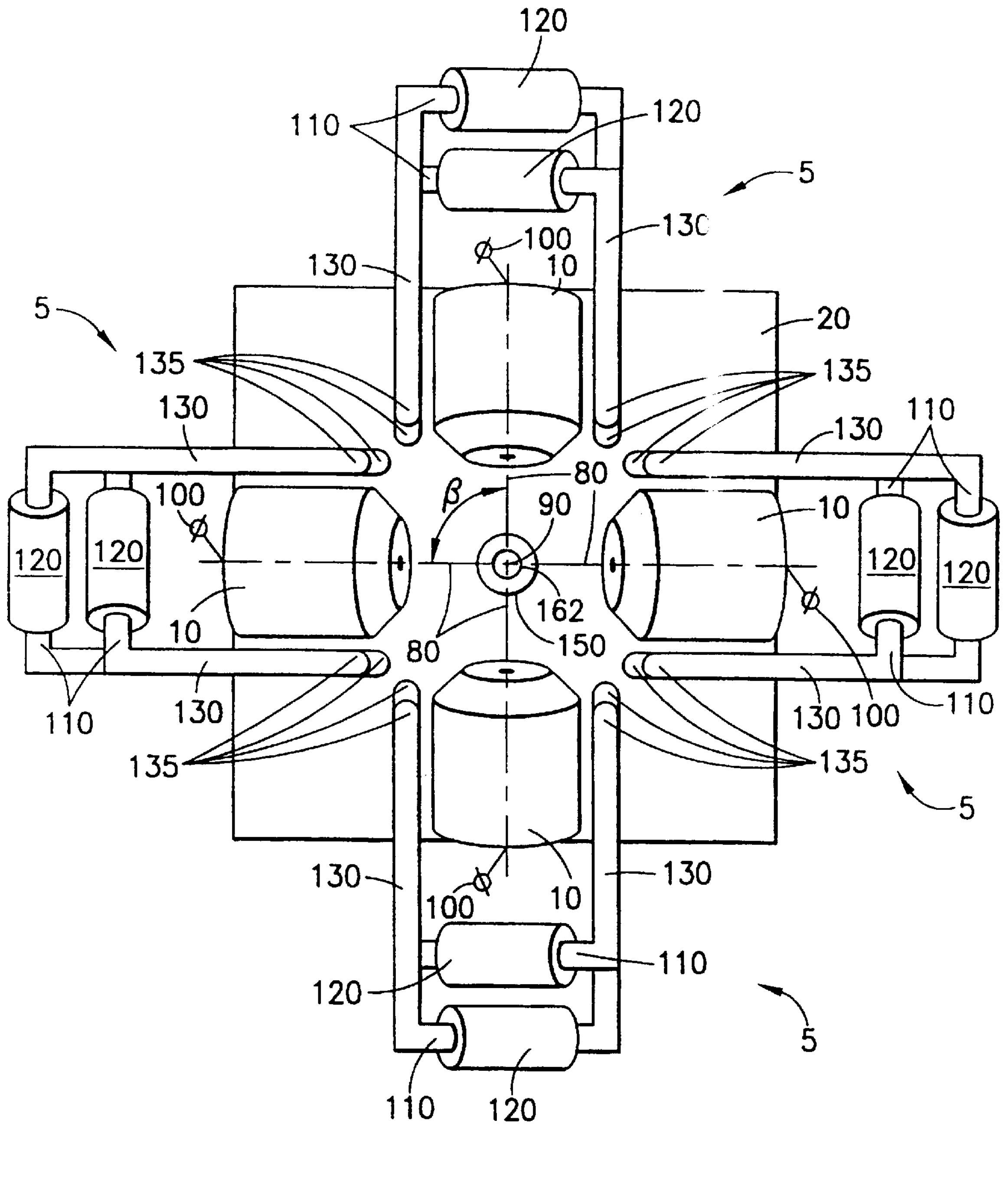
FIG. 3, which is a schematic top view diagram of another embodiment of the apparatus of the present invention incorporating two plasma jet generator assemblies made in accordance with the present invention.

In the apparatus, a plurality of plasma jet generator assemblies 5 in multiples of two are used. The plurality of generator assemblies 5 are spatially positioned about an apparatus axis 90 and angularly positioned so that the electrode axis 80 forms angle $\alpha$ with the apparatus axis 90. The angle $\alpha$ is selected to be less than 90 degrees. Referring to FIG. 2, if two generator assemblies 5 are used, the generator assemblies are positioned on opposite sides of the apparatus axis 90 so that their corresponding electrode axes 80 and the apparatus axis 90 form a basic plane. Referring to FIG. 3, if four generator assemblies 5 are used, they are positioned around apparatus axis 90 with angle $\beta \cong 90°$ between their corresponding basic planes. If more than four generator assemblies 5 are used, they are located around the apparatus axis 90 with angle $\beta \cong 360°/N$ between their corresponding basic planes, where N is the quantity of generator assemblies 5. Each of the electrodes 60 of the generator assemblies 5 are connected in pairs to a DC power supply 100.

The generator assemblies are provided with the magnetic deflecting system as described above. The ends 135 of the poles 130 are positioned around the electrode axes 80. The ends 135 of each pole 130 are located in a plane which is perpendicular to the corresponding electrode axis 80. The plane formed by the ends 135 intersects the corresponding electrode axis 80 at a position in a range between the corresponding electrode chamber orifice 40 and a point of intersection 175 between the electrode axis 80 and apparatus axis 90. Each of the pole ends 135 is positioned from its corresponding electrode axis 80 a distance that is more than the diameter of the corresponding electrode chamber orifice 40. The length of each of the pole ends 135 along its corresponding electrode axis 80 and the width of each of the pole ends 135 are chosen to be greater than the diameter of the corresponding electrode chamber orifice 40. The centers of the pole ends 135 are positioned at different sides relative to the corresponding basic plane formed thereby.

Referring to FIG. 1, the apparatus may be provided with injection tube 150 having an outlet hole 162 at end 160. The tube 150 is affixed in the base 20 and aligned with apparatus axis 90. The distance between the end 160 of the injection tube 150 and the point of intersection 175 of the electrode unit axes 80 and apparatus axis 90 is chosen to avoid thermal damage to the end 160 of the injection tube 150 end by heat from the adjacent plasma jets.

Figure 4:
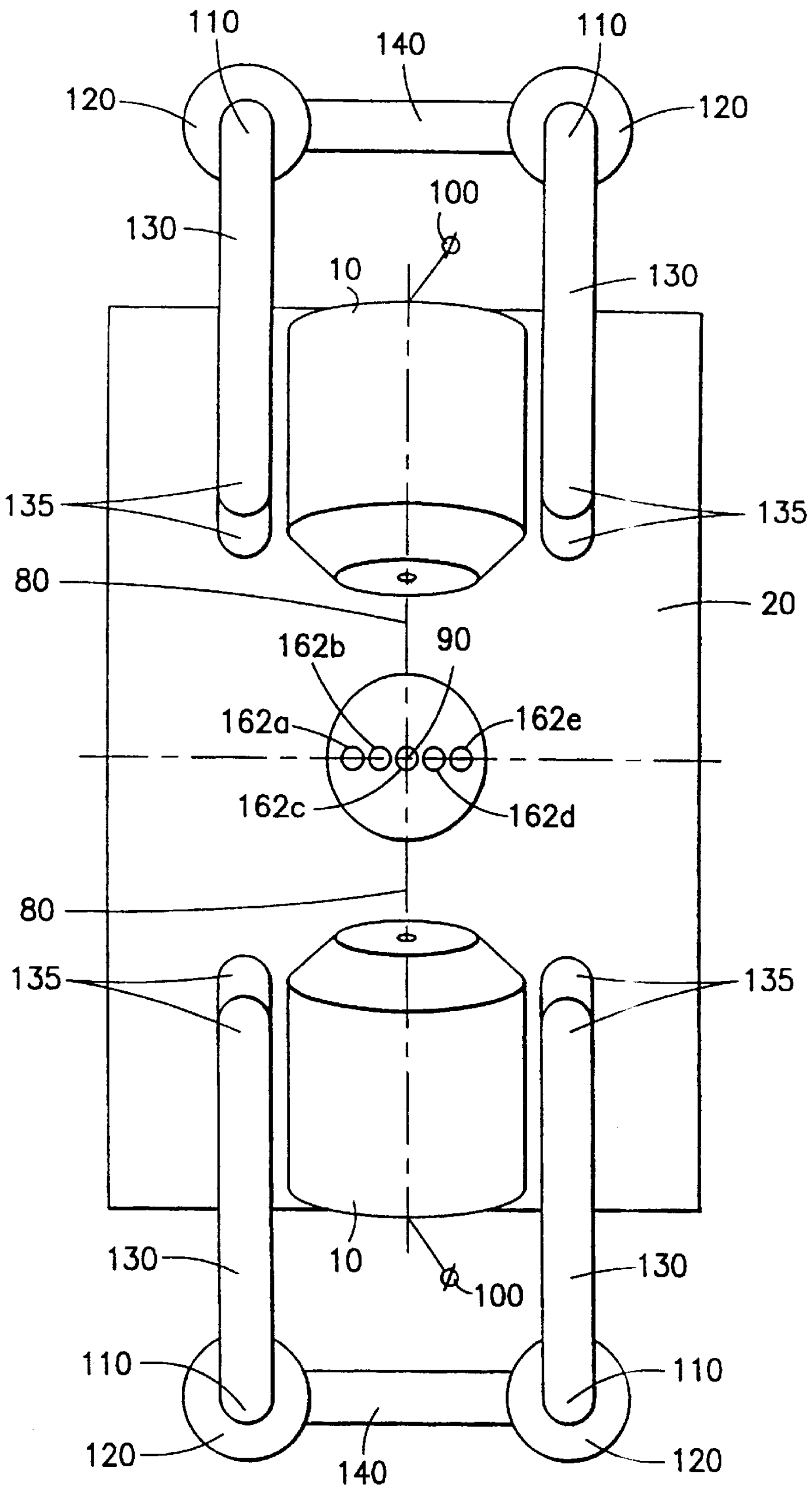
FIG. 4, which is a schematic top view diagram of still another embodiment of the present invention.
Figure 5:
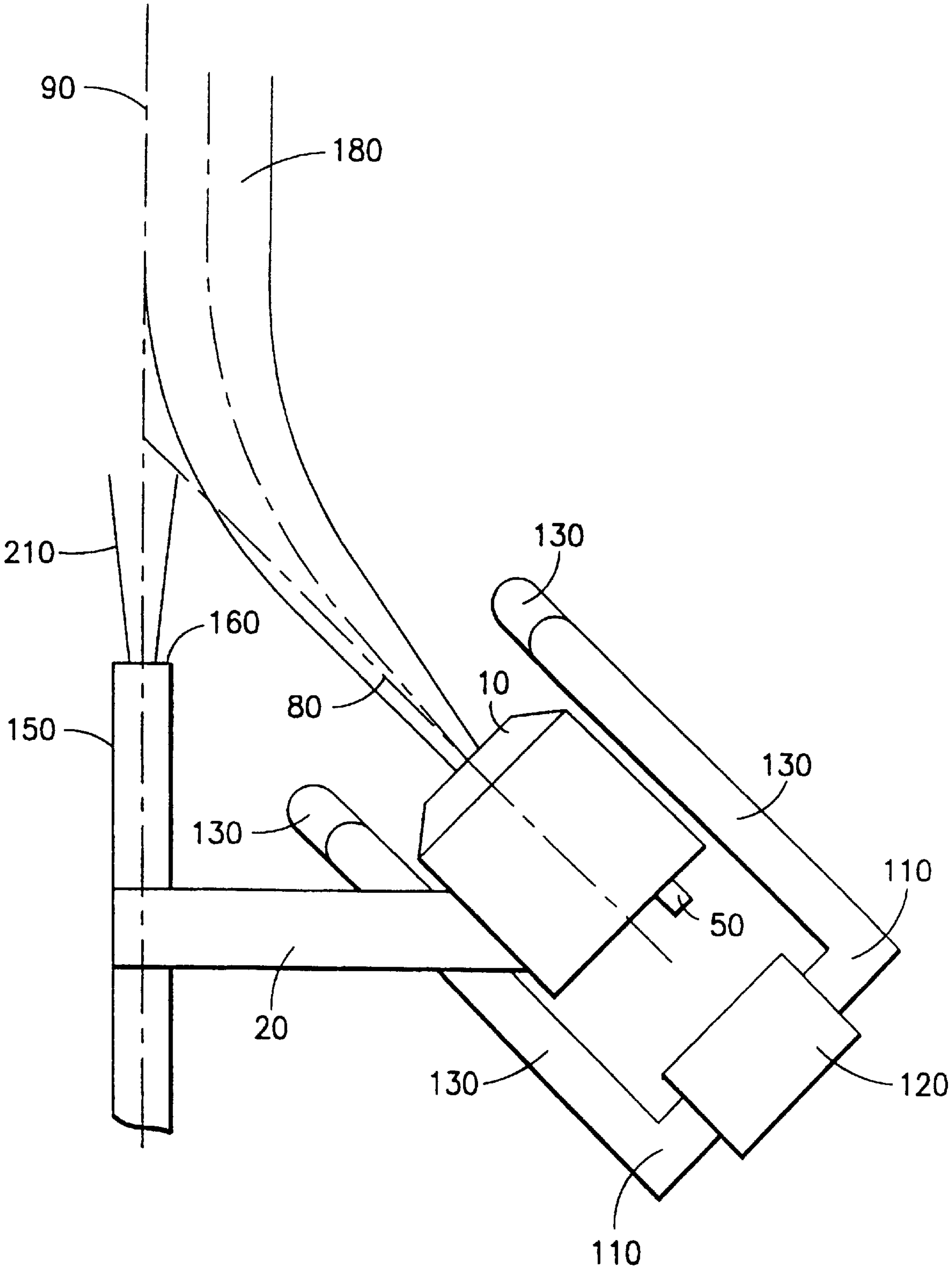
FIG. 5, which is a side view partial schematic diagram of the apparatus of the present invention illustrating the positioning of a plasma jet generator relative to a common axis.
Figure 6:
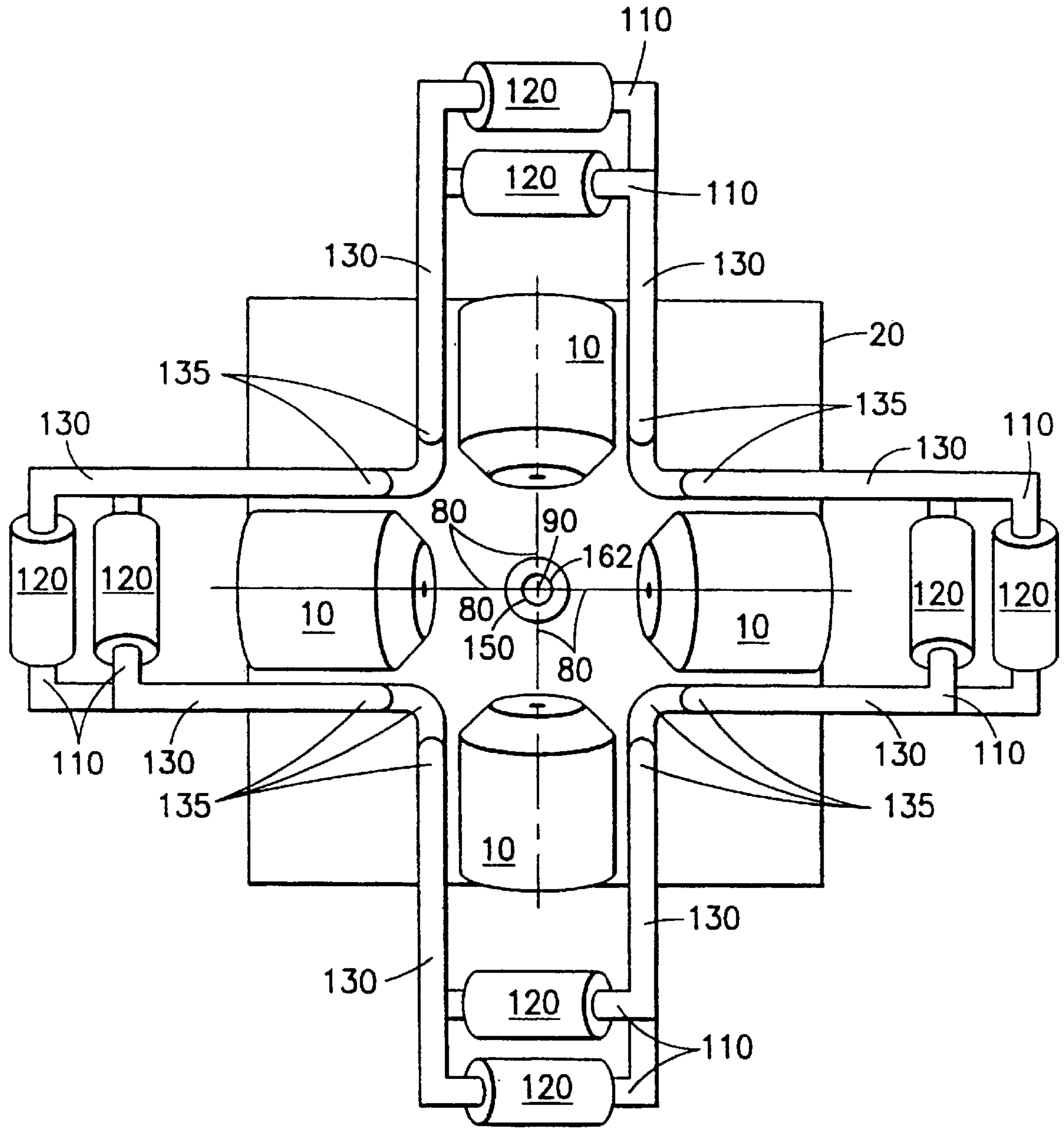
FIG. 6, which is a schematic to view diagram of another embodiment of the present invention.

Referring to FIG. 4, for design simplification, each of the unclosed magnetic circuits formed by the U-shaped members may be connected to another corresponding unclosed magnetic circuit via bridge member 140. Also, referring to FIG. 6, for design simplification, one of the poles 130 of one of first unclosed magnetic circuit of one electrode assembly may be connected with the nearest pole 130 of another unclosed magnetic circuit of the another adjoined electrode assembly. In both cases, the magnetic system has the same main external magnetic field pattern as the separated magnetic circuits, but the coils' 120 effectiveness is reduced due to the increase of side-by-side magnetic field losses of the coils. Referring to FIGS. 1 and 2, if the apparatus contains only two generator assemblies 5, the end 160 of injection tube 150 may be provided with an opening 162 which has a dimension along the basic plane formed by the electrode axes 80 that is less than the dimension of the electrode chamber orifices 40. Along the direction perpendicular to the basic plane formed by the electrode axes 80, the dimension of the opening 162 may be made larger than the dimension along the basic plane. In other words, the opening 162 in the tube 150 may have an oval shape wherein the long axis of the oval is normal or perpendicular to the plane formed by the electrode axes 80.

Referring to FIG. 4, the end 160 of the injection tube 150 may be made with a plurality of openings 162*a*–162*e*. The plurality of openings 162*a*–162*e* are preferably aligned along the plane normal or perpendicular to the basic plane formed by the electrode axes 80.

Referring to FIG. 1, according to the present invention, gas is delivered into each electrode chamber 10 through gas inlet 50, in the direction indicated by arrow A. An electrical arc discharge 170 with DC electrical current I is ignited between the electrodes 60 of each pair of electrode chambers 10 with the help of DC power supply 100. The distance between electrode chambers 10 in every pair and angle α are chosen to provide a stable electrical discharge 170 from DC power supply 100.

The gas flowing through the orifices 40 of the chambers 10 and electrical discharge 170 create plasma jets 180. The plasma jets 180 combine in mixing zone 190 to form a combined plasma flow 200. Because of the electro magnetic interaction of the electrical currents I in the plasma jets 180, a force $F_S$ is applied to each of the plasma jets 180 which is directed away from the apparatus axis 90. As a result of the application of force $F_S$, the plasma jets 180 bend from their initial directions along electrode axes 80 out towards the apparatus axis 90.

Figure 7:
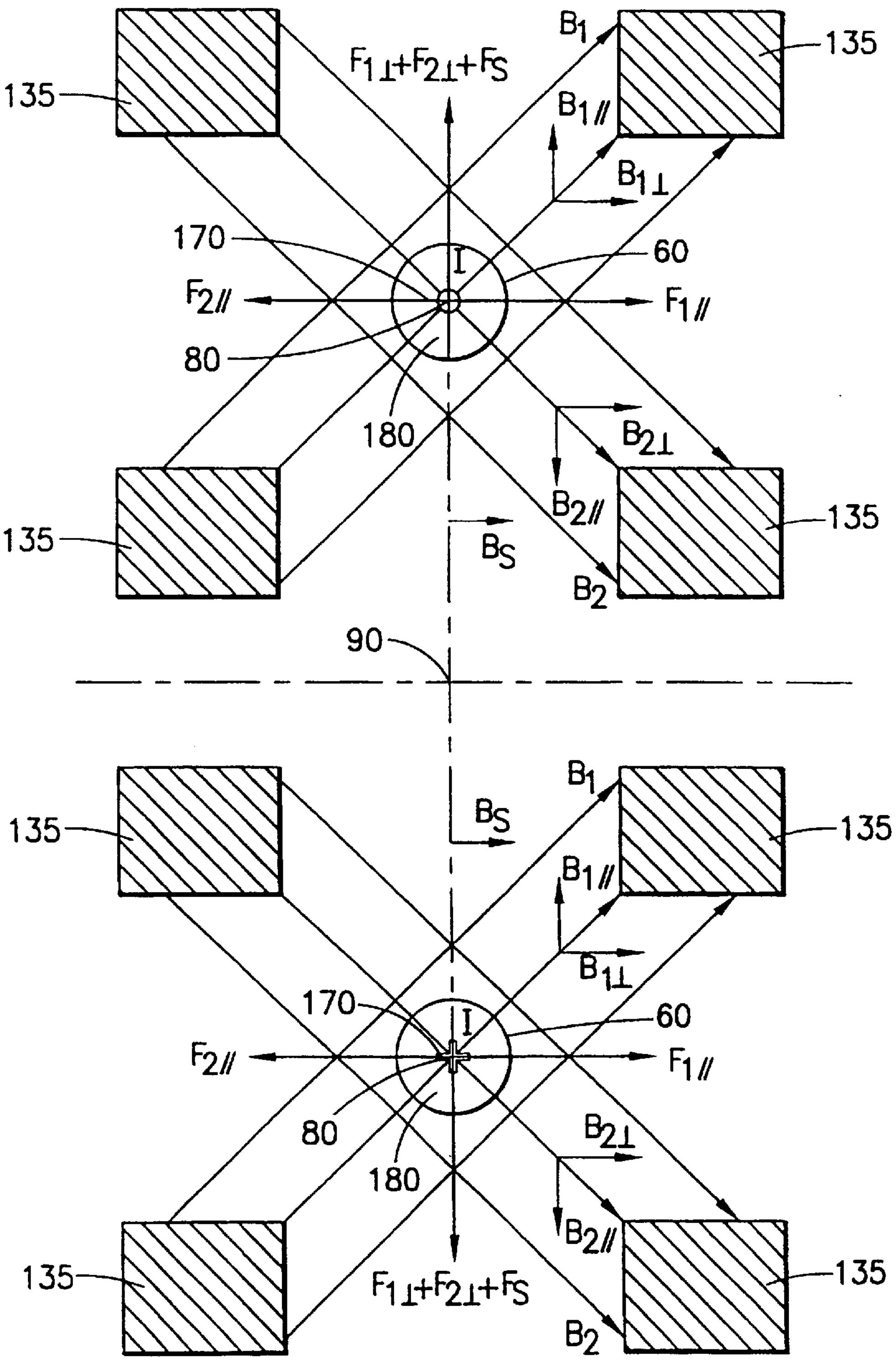
FIGS. 7 and 8, which are schematic diagrams of the magnetic fields.
Figure 8:
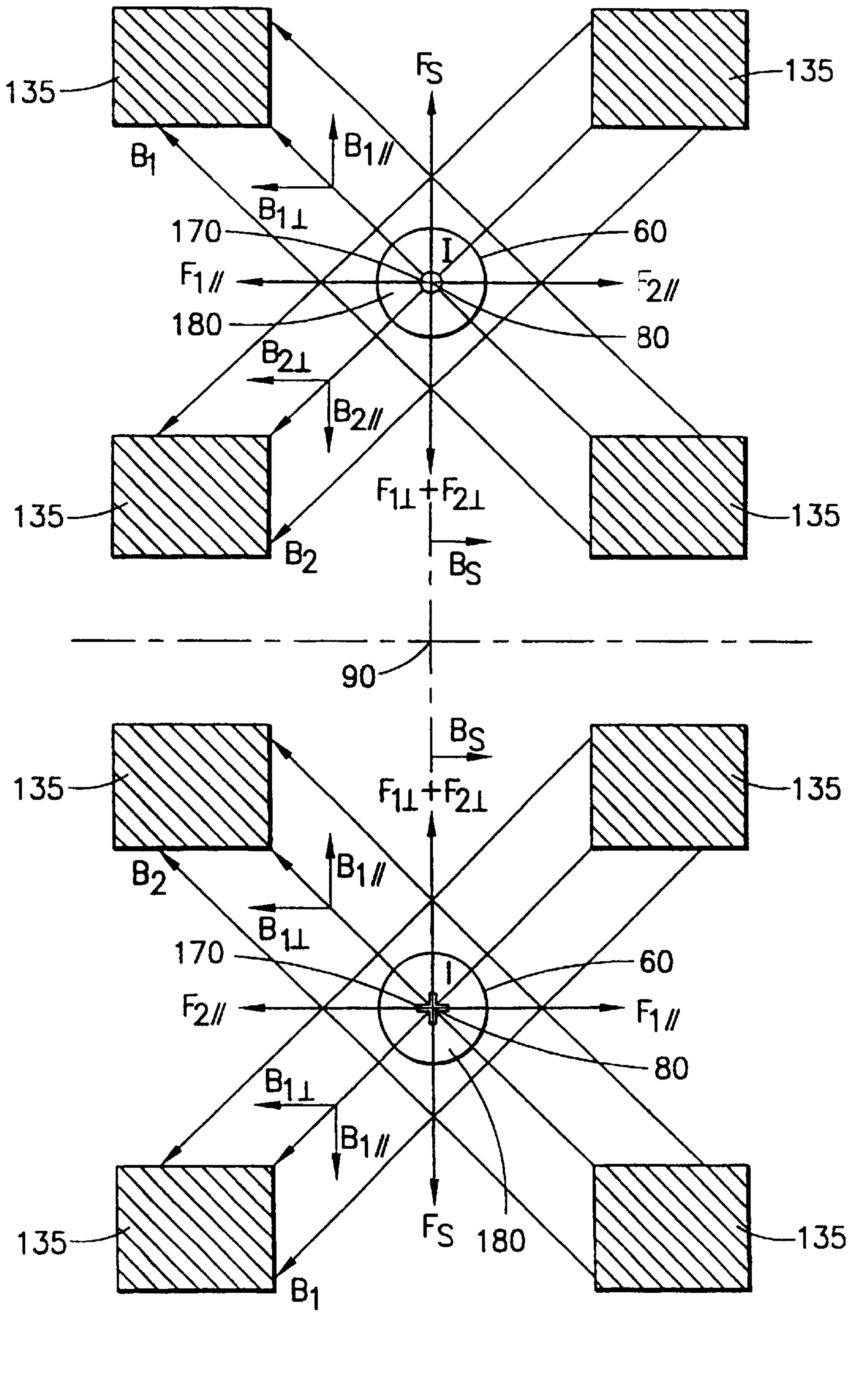

An electrical current is conducted through the coil 120 of every unclosed magnetic circuit 110. Referring to FIGS. 7 and 8, as a result of the electrical current flowing through coil 120, an external magnetic field is created between the ends of the poles 130 of each of the unclosed magnetic circuit 110.

Referring to FIG. 7, which looks into the apparatus axis 90, if the electrode 60 having electrode axis 80 which is directed with an angle α that is more than 45 degrees with respect to the apparatus axis 90, then the directions of electrical current in the coils 120 of both unclosed magnetic circuits 110 are chosen to provide external magnetic field induction vector components $B_{1\perp}$ and $B_{2\perp}$ that are directed perpendicular to the basic plane formed by the electrode axes 80 and the apparatus axis 90, and are oriented along the same direction as the orientation of the corresponding plasma jet's 180 self-magnetic field induction vector $B_S$, due to its current I, at the region of the basic plane between the electrode axis 80 and apparatus axis 90. The current I of the upper electrode and the current I of the lower electrode flow in opposite directions as illustrated in FIG. 7. The external magnetic field induction vector components $B_{1\perp}$ and $B_{2\perp}$ create electromagnetic forces $F_{1\perp}$ and $F_{2\perp}$ correspondingly that are applied to the plasma jet 180 and directed away from the apparatus axis 90. The quantity of electrical currents flowed through the coils 120 are chosen to provide a sum of forces $F_{1\perp}$ and $F_{2\perp}$ that is strong enough to position the plasma jet 180 at a desirable distance along the apparatus axis 90.

Referring to FIG. 8, if the electrode 60 having axis 80 which is directed with an angle α that is less than 45 degrees between the corresponding electrode axis 80 and apparatus axis 90, then the directions of electrical current in the coils 120 of both unclosed magnetic circuit 110 are chosen to provide external magnetic field induction vector components $B_{1\perp}$ and $B_{2\perp}$ that are directed perpendicular to the basic plane formed by the electrode axes 80 and the apparatus axis 90, are oriented along the direction which is opposite to the orientation of corresponding plasma jet 180 self-magnetic field induction vector $B_S$ at the region of the basic plane between the electrode axis 80 and apparatus axis 90. The external magnetic field induction vector components $B_{1\perp}$ and $B_{2\perp}$ create electromagnetic forces $F_{1\perp}$ and $F_{2\perp}$ correspondingly that are applied to the plasma jet 180 and directed to the apparatus axis 90. The quantity of electrical currents flowed through the coils 120 is chosen to provide compensation of the force $F_S$ by the sum of forces $F_{1\perp}$ and $F_{2\perp}$ to position the plasma jet 180 at a desirable distance from the apparatus axis 90.

In both situations illustrated in FIGS. 7 and 8, due to the specific location of the pole ends 135, the external magnetic field induction vector components $B_{1//}$ and $B_{2//}$, that are directed parallel to the basic plane, are oriented in opposite directions. The external magnetic field induction vector components $B_{1//}$ and $B_{2//}$ create electromagnetic forces $F_{1//}$ and $F_{2//}$ correspondingly that are applied to the plasma jets 180, directed perpendicular to the basic plane and oriented in opposite directions. The value and direction of the resulting force is determined by the difference between the forces $F_{1//}$ and $F_{2//}$. So the position of the plasma jet 180 relative to the basic plane is changed by changing the quantity of electrical currents flowing in the coils 120.

When a combined plasma flow 200 is produced from two plasma jets 180 as illustrated in FIGS. 7 and 8, the quantity of electrical current flowing through coils 120 of the unclosed magnetic circuits 110 may be changed synchronously so that the sum of the currents is kept constant. As a result, the combined plasma flow 200 may be deflected from its initial direction along apparatus axis 90 and oscillated in the plane perpendicular to the basic plane formed by the electrode axes 80 and the apparatus axis 90.

Referring to FIG. 1, According to the present invention, a substance 210 for treating a substrate may be injected into the combined plasma flow. The substance is injected into the combined plasma flow 200 by directing the substance at the mixing zone 190 with injection tube 150.

As will be understood from the foregoing description, according to the present invention, several embodiments of an apparatus for generating and deflecting a plasma jet for treating substrates has been described. It is to be understood that the embodiments described herein are merely illustrative of the principles of the invention. Various modifications may be made thereto by persons skilled in the art which will embody the principles of the invention and fall within the spirit and scope thereof. Hence, the present invention is deemed limited only by the appended claims and the reasonable interpretation thereof.

What is claimed is:

1. A plasma generator (5) for generating and deflecting a plasma jet comprising an electrode chamber (10) having a gas inlet (50); and an outlet orafice (40); an electrode (60) positioned within the electrode chamber, the electrode defining an electrode axis (80); and a first magnetic deflection system for applying a first magnetic field (B1) to a plasma flowing from the electrode chamber outlet so as to cause the plasma to flow away from the electrode axis in a first direction as a result of a first force (F1) on the plasma caused by the first magnetic field, the first magnetic deflection system comprising a first U-shaped member formed from a first base (110) and a pair of first poles (130) having ends (135) and a first coil (120) positioned about the base, wherein the first magnetic deflection system is positioned about the electrode chamber so that the poles of the pair of first poles are on opposite sides of the electrode axis defined by the electrode positioned within the electrode chamber;

the generator being further characterized in that:

the generator is provided with a second magnetic deflection system for applying a second magnetic field to a plasma flowing from the electrode chamber outlet so as to cause the plasma to flow away from the electrode axis in a second direction as a result of a second force (F2) on the plasma caused by the second magnetic field, the second magnetic deflection system comprising a second U-shaped member formed from a second base (110) and a pair of second poles (130) having ends (135) and a second coil (120) positioned about the second base, wherein the second magnetic deflection system is positioned about the electrode chamber so that the poles of the pair of second poles are on opposite sides of the electrode axis defined by the electrode positioned within the electrode chamber, and wherein the first pair of poles and the second pair of poles are uniformly positioned about the electrode axis so that the magnetic field across the first pair of poles is substantially perpendicular to the magnetic field across the pair of second poles.

2. An apparatus for treating substrates with a plasma jet, the apparatus comprising first and second plasma jet generator assemblies, each of the generator assemblies further comprising an electrode chamber (10) having a gas inlet (50) and an outlet orafice (40), an electrode (60) positioned within the electrode chamber, the electrode defining an electrode axis (80), and a first magnetic deflection system for applying a first magnetic field to a plasma flowing from the electrode chamber outlet so as to cause the plasma to flow away from the electrode axis in a first direction as a result of a first force (F1) on the plasma caused by the first magnetic field, the first magnetic deflection system comprising a first U-shaped member formed from a first base (110) and a pair of first poles (130) having ends (135) and a first coil (120) positioned about the base, wherein the first magnetic deflection system is positioned about the electrode chamber so that the poles of the pair of first poles are on opposite sides of the electrode axis defined by the electrode positioned within the electrode chamber;

and an injection tube, defining an apparatus axis, positioned between the the generator assemblies;

the apparatus being further characterized in that:

each of the generator assemblies are provided with a second magnetic deflection system for applying a second magnetic field to a plasma flowing from the electrode chamber outlet so as to cause the plasma to flow away from the electrode axis in a second direction as a result of a second force (F2) on the plasma caused by the second magnetic field, the second magnetic deflection system comprising a second U-shaped member formed from a second base (110) and a pair of second poles (130) having ends (135) and a second coil (120) positioned about the second base, wherein the second magnetic deflection system is positioned about the electrode chamber so that the poles of the second pair of poles are on opposite sides of the electrode axis defined by the electrode positioned within the electrode chamber, and wherein the poles of the first and second pairs of poles are positioned uniformly around the electrode axis so that the magnetic field across the first pair of poles is substantially perpendicular to the magnetic field across the pair of second poles.

3. The apparatus according to claim 2, wherein the first and second plasma jet generator assemblies (5) are positioned with respect to the apparatus axis (90) so as to form a common plane between the electrode axes (40) of the generator assemblies and the apparatus axis, wherein generator assemblies are further positioned such that the apparatus axis is between the respective electrode axes such that the electrode axes form an angle $\alpha$ with the apparatus axis, and such that the first and second plasma jet generator assemblies are positioned sufficiently close to each other to enable plasmas generated by each generator assembly to form a combined plasma flow having a mixing zone.

4. The apparatus according to claim 3, wherein the angle $\alpha$ is greater than 45 degrees.

5. The apparatus according to claim 3, wherein the angle $\alpha$ is less than 45 degrees.

6. The apparatus according to claim 3, wherein the angle $\alpha$ is 45 degrees.

7. The apparatus according to claim 3, wherein the injection tube has an oval shaped outlet, wherein the oval shaped outlet has a long axis and a short axis, and wherein the long axis of the oval shaped outlet is positioned substantially normal to the common plane.

8. The apparatus according to claim 3, wherein the injection tube has a plurality of outlets, and wherein the plurality of outlets are arranged along a line substantially normal to the common plane.

* * * * *